(12) United States Patent
Paltenghe

(10) Patent No.: US 6,757,826 B1
(45) Date of Patent: Jun. 29, 2004

(54) DIGITAL GRAPHIC SIGNATURE SYSTEM

(75) Inventor: Cris T. Paltenghe, Northridge, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/290,427

(22) Filed: Apr. 13, 1999

Related U.S. Application Data

(60) Provisional application No. 60/081,748, filed on Apr. 14, 1998.

(51) Int. Cl.⁷ .................................................. G06F 1/24
(52) U.S. Cl. ........................ 713/170; 713/176; 713/179; 713/182
(58) Field of Search .............................. 713/176, 179, 713/182, 170

(56) References Cited

U.S. PATENT DOCUMENTS

| | | | |
|---|---|---|---|
| 5,377,266 A | * 12/1994 | Katta et al. ............. | 348/416.1 |
| 5,502,764 A | 3/1996 | Naccache .................. | 380/23 |
| 5,636,279 A | * 6/1997 | Katta et al. ............... | 380/217 |
| 5,636,292 A | * 6/1997 | Rhoads ...................... | 235/382 |
| 5,689,567 A | 11/1997 | Miyauchi .................... | 380/25 |

FOREIGN PATENT DOCUMENTS

| | | | |
|---|---|---|---|
| EP | 0 494 696 A2 | 7/1992 | .......... G07F/19/00 |
| EP | 0 494 796 A2 | 7/1992 | .......... G07F/19/00 |
| EP | 581 317 A2 | 2/1994 | .......... G07D/7/00 |
| EP | 0 581 317 A2 | 2/1994 | .......... G07D/7/00 |
| EP | 651 357 A1 | 5/1995 | .......... G07F/7/12 |
| EP | 0 651 357 A1 | 5/1995 | .......... G07F/7/12 |
| EP | 581 317 A3 | 5/1996 | .......... G07D/7/00 |
| EP | 494 796 B1 | 4/1998 | .......... G07F/19/00 |
| WO | WO 91/10207 | 7/1991 | .......... G06K/9/00 |
| WO | WO 96/03286 | 2/1996 | .......... B42D/15/10 |

OTHER PUBLICATIONS

International Search Report dated Sep. 21, 1999.
Examination Report issued by the Australian Patent Office for Singapore Application No. 9901674–3, dated Sep. 26, 2000 (mailing date).
Communication Pursuant to Article 96(2) EPC issued by the European Patent Office for Application No. 99 201 123.9–2207, Aug. 4, 2000 (Date of Mailing).

* cited by examiner

*Primary Examiner*—Thomas R. Peeso
(74) *Attorney, Agent, or Firm*—George T. Marcou; Kilpatrick Stockton LLP

(57) ABSTRACT

The present invention relates to a digital graphic signature system and methods for use in electronic commerce. The system comprises a document portion, including information relating to the document being executed, and a signature portion. The document portion and the signature portion may be encrypted and merged into a single object readily identifiable to an individual. The terminology "digital graphic signature" or "digigraphic signature" is utilized herein to describe the merged object.

The digital graphic signature system of the present invention may be advantageously utilized in electronic transactions, including transactions over the internet and network systems. The digital graphic signature system of the present invention may also be advantageously utilized in conjunction with information banking and virtual wallets.

Also disclosed is a digital graphic signet for transmitting a private communication.

24 Claims, 12 Drawing Sheets

(1 of 12 Drawing Sheet(s) Filed in Color)

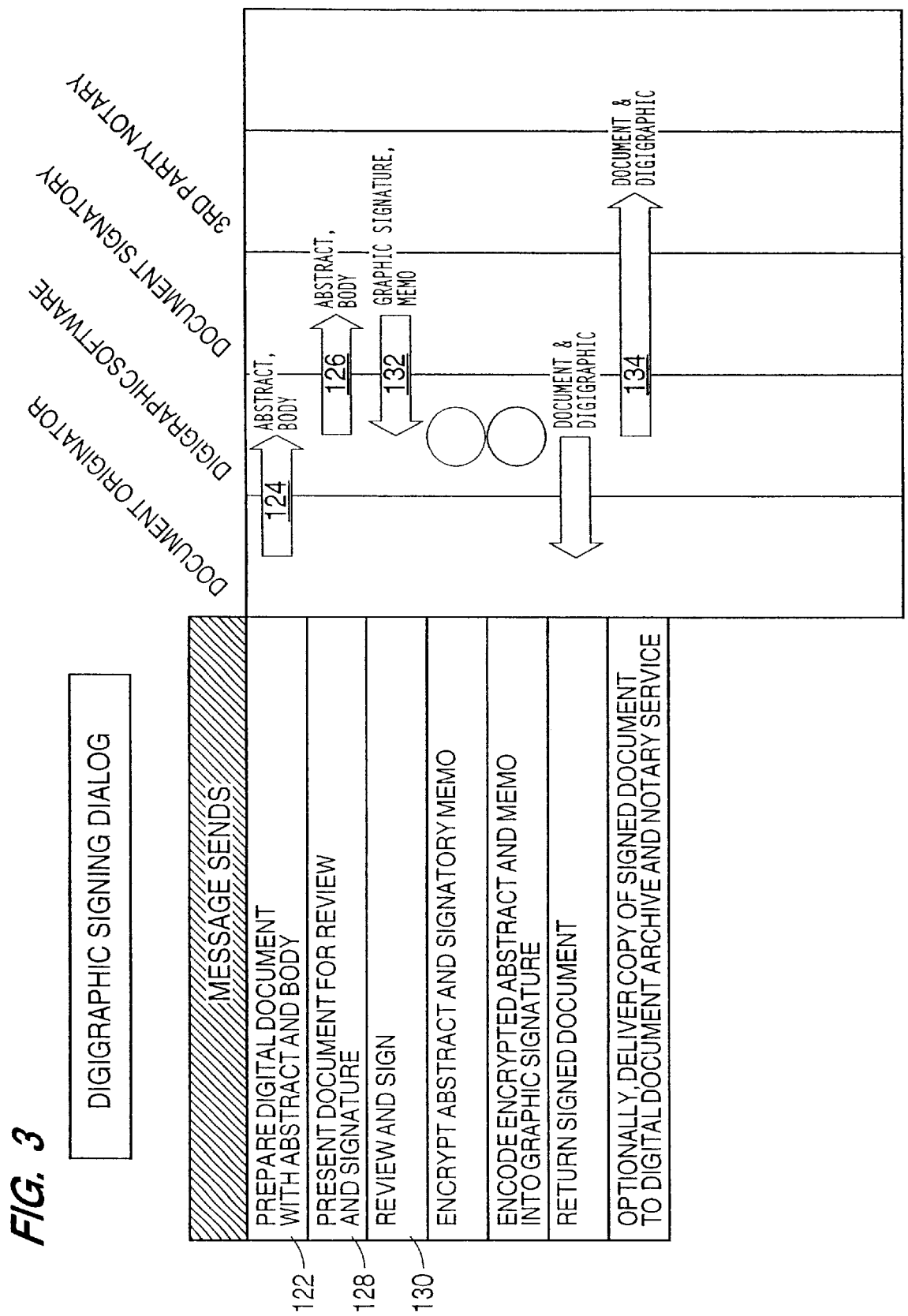

FIG. 4

| Abstract | Body | Signature |

- 221 — Abstract
- 222 — Body
- 223 — Signature

Date           03/23/1998
Invoice        352864
Merchant       Radioshack 01-3516
Sold To        Ted Smythe
Credit Card Typ Visa
Account        4321-2345-6789-3456
expires        04/99
Transaction #  1485
Authorization  023598
Note           The card issuer may apply the total amount shown
Terms          Sales & returns are subject to terms & conditions agreed to.
Thank You      Thank you for shopping at Radioshack, a division of Tandy Co
Amount Due     27.51

| Abstract | Body | Signature |

221  222  223

Invoice 352864

| Item | ID | Description | Quantity | Price | Total |
|---|---|---|---|---|---|
| 1 | 44-91 | 2Pk Ln30 Cassette tape High bias | 2 | 5.93 | 11.86 |
| 2 | 44-95 | Capstan head cleaner | 1 | 15.65 | 15.65 |
| | | | | Total | 27.51 |

212

214

210

DIGITAL GRAPHIC SIGNATURE SYSTEM

CROSS-REFERENCE TO RELATED APPLICATION

The present application claims priority under 35 USC 119(e) from US Provisional Patent Application No. 60/081,748 entitled "VIRTUAL WALLET SYSTEM" filed Apr. 14, 1998, the disclosure of which is hereby incorporated herein by reference. The present application claims priority under 35 USC 120 from U.S. patent application Ser. No. 09/190,993 filed Nov. 12, 1998, entitled "Virtual Wallet System "; and U.S. patent application Ser. No. 09/190,727 filed Nov. 12, 1998, entitled "Information Banking".

FIELD OF THE INVENTION

The present invention relates to a digital graphic signature system for use in electronic commerce. The system comprises a document portion, including information relating to the document being executed, and a signature portion. The document portion and the signature portion may be encrypted and merged into a single object readily identifiable to an individual. The terminology "digital graphic signature" or "digigraphic signature" is utilized herein to describe the merged object.

The digital graphic signature system of the present invention may be advantageously utilized in electronic transactions, including transactions over the internet and network systems. The digital graphic signature system of the present invention may also be advantageously utilized in conjunction with information banking and virtual wallets.

The present invention also relates to a digital graphic signet that may be utilized to transmit a private communication.

BACKGROUND OF THE INVENTION

In the physical world, signatures are easily recognized, particularly by their owners. The authenticity of such physical signatures, however, may be difficult to verify.

In contrast, in the digital world, digital signatures are sufficiently verifiable to support non-repudiation, using modern public key crytpgraphic techniques. Such digital signatures however may not be in a form recognizable to humans. Thus a need exists for a digital signature system that permits an individual to visually recognize their own signature. In addition to this problem, there are several other problems that need addressing in the electronic commerce and electronic financial transaction worlds.

A first problem relates to provide information to a consumer regarding the substance of a digital document to be executed. This problem may be phrased as "How does a consumer know what he or she is signing when the "document" being presented is digital?".

An additional problem relates to a consumer associating their digital signature with a digital document. This problem may be phrased as "How does a consumer recognize his or her own digital signature that has been associated with a digital document?".

For financial institutions, merchants, vendors and/or others engaged in electronic and non-electronic commerce, problems arise when a consumer fails to remember they have executed a transaction. This situation may arise in part due to the length of time between the transaction and the consumer receiving a billing statement that includes the transaction. Many customer service calls are received from consumers requesting additional documentation regarding specific transactions on their billing statements. Often the consumers have good intentions and literally do not remember the transaction. Upon receipt of a document showing the nature of the transaction, and their signature, a consumer will generally be able to remember the transaction, or recognize the transaction as fraudulent. This process, however, is costly for institutions as it involves maintaining a customer service infrastructures, including personnel, document processing and mailing capabilities.

Problems and costs that exist today in the physical world are likely to become worse in the electronic transaction arena. A particular problem with many current technologies is that consumers are not provided with visual feedback of their signature executing a document or agreement. Also the data provided in billing for electronic transactions may not provide sufficient data for a consumer to recall a transaction.

The foregoing problems, and others, are addressed by the systems of the present invention.

SUMMARY OF THE INVENTION

The present invention provides a system that allows individuals to recognize their signatures on electronic documents, and provides information relating to the document, that may enable the individual to understand the document being signed and recall their execution of the document at a later date.

According to the present invention, a digital graphic (digigraphic) signature system comprises a graphic formed by combining details relating to the document being executed, and an individual's signature. The document details and the individual's signature may be encrypted utilizing conventional techniques to provide enhanced security. The digital graphic signature may be displayed through a user interface for inspection.

Document details that may be incorporated into the digigraphic signature include:
- an abstract of the document being executed;
- the body of the document being executed;
- excerpts from the body of the document being executed; or
- an individual's notes relating to the document being executed.

In general, it is believed advantageous for many purposes to include at least an abstract comprising a digest of what an individual is actually agreeing to by executing the document. The abstract may also include reference information, including but not limited to, the date, the parties involved, transaction reference numbers and the like. Preferably, the abstract is written in plain (non-legal) terms that are readily understandable to even relatively unsophisticated consumers. Generally, the abstract will be reduced to text for purposes of forming the digigraphic signature. However, for certain applications it may be advantageous for the abstract to include graphic or pictorial information.

For certain transactions, it may be advantageous to include the body of the document being executed, or excerpts from the body of the document being executed, in the digigraphic signature in addition to, or in place of an abstract. The document body, and/or excerpts will generally be reduced to text for purposes of forming the digigraphic signature. However, for certain applications it may be advantageous to include graphic or pictorial information.

As set forth above, document details may further comprise an personal memo area that allows an individual to record information of their own choosing about the document being executed. Preferably, the individual will enter information that will help them remember the transaction in the future. Such information could include, the purpose of the transaction, the nature of the transaction, as well as other details having significance to the individual.

A representation of an individual's signature may comprise graphical data generated from a graphic of the individual signature. An individual's signature graphic may be obtained by capturing the pen strokes utilized by an individual to sign their name, for example through the use of a graphics tablet. An individual's signature graphic may also be obtained by scanning a signature from a physical document. In general, prior to the translation and merging steps described below, an individual's signature graphic will be similar to the individual's signature on a physical document.

To produce a digital graphic signature, the document details data and the individual's signature data are merged. The merging process may include encrypting both sets of data utilizing conventional electronic encryption techniques. Different portions of the document details may be encrypted with public or private keys.

For example, it may be advantageous to encrypt document abstract data with a private key of the individual who is executing the document utilizing convention public key cryptographic techniques. The abstract could then be made accessible to the individual and the other party to the transaction.

The memo text data entered by an individual could be encrypted with a symmetric key known only to the individual. As explained below, this could provide an addition insurance to the individual that the document is not forged and assist them in remembering the transaction.

The document detail data and the individual's signature data may then be merged, for example utilizing color encoding. In this technique, each data stream is utilized as color values, for example in standard RGB (red, green, blue) color encoding. For example, each byte of an abstract stream may be used to generate blue values, each byte of a memo stream may be utilized to generate green values. A non-changing red value may be used to complete the description. Other color values may also be utilized. For example, CMYK (cyan, magenta, yellow, black) color encoding may be utilized to produce the digital graphic signature with the cyan, magenta, yellow and black color values corresponding to data streams.

The digital graphic signature may be defined as a series of ink strokes using "color-points", a point defined by relative coordinates with respect to a defined signature area, and a color value. The relative coordinates may comprise x,y coordinates; r,θ coordinates or the like in a two dimensional signature area; or x,y,z coordinates or the like in a three dimensional signature area etc.

Initially, the individual's signature data may comprise captured strokes of a single color. During the merging process the initial color values are replaced with the encoded cryptotext values. The point positions may be retained to preserve the graphical appearance of the signature.

Differences in the length (byte count) of the signature data and the abstract and/or memo stream data may be handled by a bidirectional padding technique, or similar techniques understood to those of ordinary skill in the art.

If the signature data is longer than either of the abstract or memo data, zero values may be used for the blue and green portions and only the non zero, non changing red value used for the remainder of the signature data. In this way the graphical appearance of the signature is preserved, even when the abstract and/or memo data ends.

If the abstract data and/or the memo data is longer than the signature data, zero point values may be assigned to color-points, while the colors are used to encode the remainder of the messages. The remainder of the message need not assume the graphical representation of the signature data, but may appear as part of the digital graphic signature.

The resulting digital graphic signature may advantageously retain a visual appearance similar to an individual's physical signature, however will comprise points of red, green and blue color. The relative amounts of red, green and blue points will associate the digital graphic signature with a particular document, as the green and blue points will be generated in response to data specific to a particular document.

As will be understood by those of ordinary skill in the art, different colors, or a different color encoding scheme, may be utilized in a similar fashion to produce a digital graphic signature according to the present invention.

The digigraphic signature may be saved as a data file, for example a *.gif file; *.tiff file; *.pict file; *.jpg file; or the like, and associated and/or stored with data files for the transaction. Preferably, the digigraphic signature is saved in a file type capable of being displayed on a video monitor by popular computer software programs, such as internet browser software, financial transaction software, and/or word processing software.

Thus, in one aspect, a digital graphic signature of the present invention comprises a graphical representation of an individual signature produced from a plurality of points, wherein the plurality of points comprise at least a first set of points corresponding to information particular to a document being executed, and a second set of points corresponding to the individual's signature.

In another aspect, a digital graphic signature of the present invention comprises a visually recognizable multi-color graphical representation of an individual's signature capable of being displayed on a video monitor the graphical representation having a unique color scheme corresponding to the document being executed. As used herein the terminology video monitor includes computer video monitors, televisions and the like.

According to the present invention, a digital graphic signature system comprises a digital graphic signature of the present invention and computer software and hardware capable of generating and displaying the digital graphic signature system. The computer hardware may comprise a central processing unit, video monitor display; memory; modem; keyboard; mouse; trackpad; graphics tablet; scanner; printer and/or other generally available computer hardware components. It is generally preferred that the computer hardware include a graphics tablet; electronic pen; touch sensitive screen; mouse; trackball; joy stick; electronic pen; point-of-sale electronic pen apparatus or similar input device for capturing an individual's signature as "pen strokes". The same input device, or another input device such as a keyboard, is useful for allowing an individual to create a memo data file corresponding to the memo relating to the document being executed.

Computer software useful in systems of the present invention includes encryption software for encrypting data streams and color encoding data streams. Additional software, such as word processing programs, graphics programs, and the like may also be useful, for example, to allow an individual to enter a memo relating to the transaction, and for viewing the digital graphic signature.

The present invention also provides a method for producing a digital graphic signature corresponding to a document executed by an individual, the method comprising:

forming an abstract of the document;

obtaining the individual's signature;

producing a document abstract data stream from the abstract;

producing a signature data stream from the signature; and merging the document abstract data stream and the signature data stream into a digital graphic signature.

The method may further comprise:

obtaining memo data from the individual;

producing a document memo data stream; and merging the document abstract data stream, the document memo data stream and the signature data stream into a digital graphic signature.

In an alternative embodiment, the present invention provides a method for producing a digital graphic signature corresponding to a document executed by an individual, the document method comprising:

selecting details relating to the document;

forming an abstract of the document;

obtaining the individual's signature;

producing a document details data stream from the details;

producing a document abstract data stream from the abstract;

producing a signature data stream from the signature; and merging the document details data stream; the document abstract data stream and the signature data stream into a digital graphic signature.

This method may further comprise:

obtaining memo data from the individual;

producing a document memo data stream; and merging the document details data stream; the document abstract data stream, the document memo data stream and the signature data stream into a digital graphic signature.

The data streams may be obtained and merged utilizing the techniques described above and in greater detail below. In addition, the data streams may be encrypted.

In a further aspect, the present invention provides a method and means for providing a private communication between two parties, for example two parties to a transaction. The present invention provides a functionality referred to herein as a "digital graphic signet" or a "digigraphic signet". The digital graphic signet may provide additional functionality to the digital graphic signatures of the present invention discussed herein. As will be understood by those of ordinary skill in the art, the digital graphic signet may also be utilized independently.

As discussed herein, the digital graphic signature, systems and methods of the present invention provide increased functionality in comparison with digital signatures and digital certificates alone. They address the consumer perceptual need to feel comfortable with signing a digital document, and to be able to recognize a digital document they have signed, while having assurances that their signature was not forged, and it was not copied from another document.

The signatures, systems and methods of the present invention add a human factor to conventional cytography that makes it recognizable and useful, for example by allowing a memo that assists the signatory in remembering the transaction. Additional benefits are that digital graphic signatures according to the present invention are generally smaller than conventional digital certificates, and therefore may be more desirable for storage purposes and to reduce network traffic loads. They are unique in the digital signature world in that their content may include representing a recognizable graphic of a handwritten signature while also containing digital signature information, using the most appropriate prevailing cryptographic techniques.

As discussed herein, a digital graphic signature of the present invention may utilize a technique similar to steganography to encode a signatory's memo in the green color bytes, and the document's abstract in the blue color bytes, into a graphic representation of their hand written signature.

The technique is not necessarily technically steganography as it is not strictly necessary to hide the fact that there are messages present and encoded into the graphic. Therefore, DigiGraphic signatures do not attempt to hide the content of a communication between two or more parties. The memo is intended only for the signatory's use, and uses a secret key known only to the signatory. Any third party with the signatory's public key can verify the signature. Its purpose is for the authentication of the signatory, and to ensure non-repudiable transactions, not for encryption of private communications. It should be understood, however, that it is possible to encrypt a digital graphic signature of the present invention and such embodiments fall within the scope of the present invention. An advantage of embodiments of the present invention is that further encryption may not be necessary.

The terminology digital graphic "signet" is borrowed from the ancient notion of a signet ring, which was used to seal a private communication between two parties. The analogy breaks down quickly, however, for in the ancient world, a broken seal indicated that the privacy had been compromised. It could not prevent the privacy from being compromised. According to the present invention a digital graphic signet is an embodiment of a digital graphic signature of the present invention that further includes a confidential communication between two parties. The digital graphic signet utilizes a color value, for example the red color value in a RGB color scheme for the encoding and transmitting of a confidential communication. Further details are set forth below.

A digital graphic signet of the present invention may also be utilized in a method of the present invention by encoding a confidential communication in a data stream.

The digital graphic signature, digital graphic signet, systems and methods of the present invention may be advantageously utilized in electronic transactions, including transactions over the internet and network systems. The digital graphic signature system of the present invention may also be advantageously utilized in conjunction with information banking and virtual wallets such as those described in U.S. patent application Ser. No. 09/190,993 filed Nov. 12, 1998, entitled "Virtual Wallet System "; and U.S. patent application Ser. No. 09/190,727 filed Nov. 12 1998, entitled "Information Banking" and related technologies described in U.S. patent application Ser. No. 09/291,294, filed Apr. 14, 1999, entitled "System and Method for Securely Storing Electronic Data"; and U.S. patent application Ser. No. 09/291,295, filed Apr. 14, 1999, entitled "System and Method for Controlling Transmission of Stored Information to Internet Websites". The disclosure of each of these applications is hereby incorporated herein by reference.

The advantages of the digital graphic signature system and method of the present invention include the following.

An individual may visually recognize their own signature.

In previous alternatives, a graphic could be included with the document of the individual's signature. However, traditional graphics are easily copied and therefore relatively simple to forge. Additionally, there is nothing inherent about a traditional graphic that securely associates the graphic with a document being executed. In contrast, the digital graphic signature created utilizing the present invention is relatively difficult to forge and associated with the document being executed.

An additional advantage is that the digital graphic signature of the present invention may be verified. To verify that the individual was indeed the person who executed the document, the known, public key could be utilized to decrypt the abstract portion of the signature. According to the present invention, this abstract is encoded into the graphic signature. The abstract should match exactly the document abstract that is not encrypted in the document. This demonstrates that the document was signed by the consumer (because they were the only person in possession of the private key that produced the signature) and that the disnature is associated to a specific document due to the abstracts matching.

In addition, the individual may use their secret key to read the memo encoded into the graphic signature. Insofar as the memo is not in the document, and cannot be decrypted by anyone else, unlike the abstract, the memo provides the individual with an additional assurance that the document was not forged. The memo may also assist the individual in remembering the document.

An advantage of a digital graphic signet embodiment of the present invention is that a digital graphic signature may include a confidential communication between two parties.

Further details and advantages of the present invention will become apparent from the following description and the appended figures.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 3 is a flowchart of a digital graphic signing dialog function of a digital graphic signature system of the present invention.

FIG. 4 is a sample screenshot of a document abstract before signing in a digital graphic signature system of the present invention.

FIG. 5 is a sample screenshot of a document body in a digital graphic signature system of the present invention.

DETAILED DESCRIPTION OF THE INVENTION

The features and advantages of the digital graphic signature systems and method of the present invention are explained in the following paragraphs with reference to the Figures.

Figure 1:
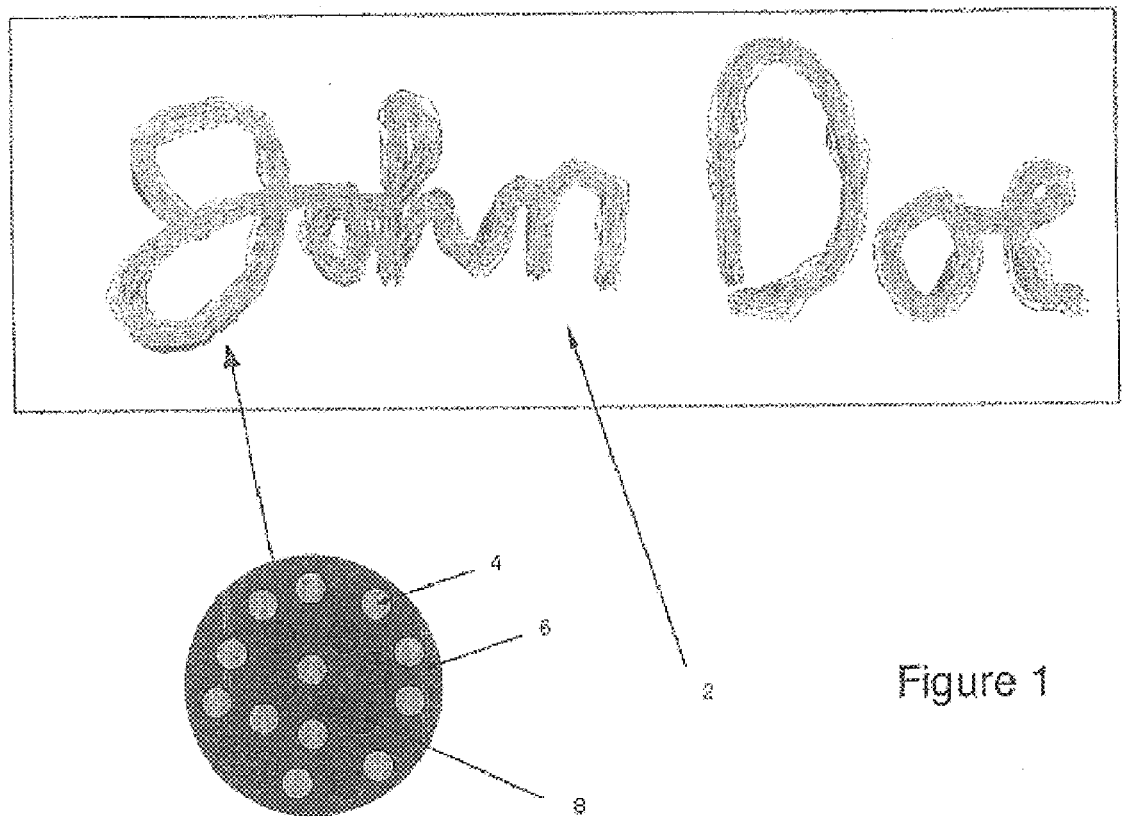
FIG. 1 depicts an embodiment of a digital graphic signature of the present invention.

FIG. 1 depicts a possible embodiment of an individual's, "John Doe", digital graphic signature according to the present invention. As shown in FIG. 1, a digital graphic signature of the present invention has a visual appearance, 2, similar to an individual's written signature. As shown in the cut-away view, the visual representation is formed by individual points in a plurality of different colors. For example, the visual representation may be formed by green points 4, blue points 8, and red points 6. The relative number and position of the points of each color will be unique for each transaction and based on the relative amounts and kind of document data and signature data that is color coded to produce the digital graphic signature. In general, however, the overall visual representation will be similar to an individual's written signature to simplify identification.

A simple embodiment of a DigiGraphic signature includes a graphical user interface (GUI or simply UI) that allows a user to see:

1) an abstract of the document to be signed;
2) the body or detail of the document to be signed;
3) a signature pad area to graphically sign their name
4) a personal memo area.

The abstract may comprise a digest of what a consumer is actually agreeing to by signing the document. The abstract is preferably in plain (non-legal) terms, and reduced to a text representation (devoid or graphics etc.). In effect, the abstract is actually what is being signed. The abstract may additionally include other relevant items including for example the date and the names of the parties to the agreement.

Once a consumer has read the document and has made a decision to sign, they move to the signature area and graphically sign their name. Additionally, the consumer may be encouraged to enter a memo in the personal memo area to remember the transaction they are executing.

The pen strokes utilized to sign the document, and the memo, are captured via a computer system, hardware and software. In addition, the computer system will encode the text of the abstract and the memo into the graphic signature. A preferred technique is similar to steganography.

First the two message streams are encrypted using modern cryptography. The abstract may be encrypted with the consumer's private key using modern public key cryptographic techniques. The memo text may be encrypted using a symmetric key known only to the consumer.

The two encrypted streams are than used as color values in standard red, green, blue (RGB) color encoding. For example, each byte of the abstract stream would be used for the blue values, which the memo stream byte values are sued for the green values. A non changing red value would be used to complete the color description.

The graphical signature is defined as a series of ink strokes using "Color-Points". a point (relative x and y coordinates with respect to a defined signature area), and a color value. The capture ink strokes are initially captured in a single color. During the encoding process, the color values are replaced with the encoded cryptotext values. The point positions are retained, of course, to preserve the graphical appearance of the signature.

Differences in the length (byte count) of the graphical signature strokes and the abstract and memo streams are handled by bidirectional padding. If the graphical signature is longer than either of the two messages, zero values are used for the blue and green portions and only the non zero, non changing red value is used. In this way the graphic appearance of the signature is preserved, even when the messages end. If one of the messages is longer than the graphical signature, zero point values are assigned to Color-points, while the colors are still used to encode the rest of the message(s). The interface is designed not to attempt to draw strokes that have no positional value, but the non-drawn portion of the signature still preserves the messages.

The graphical representation of the users signatures has been merged with a digital signature into a single object. This merged object has several advantages, including the following.

Consumers can visually recognize their own signatures. In previous alternatives, a graphic might be included with the document of the consumer's signature. However, normal graphics are easily copied, and therefore forged. Additionally, there is little inherent about a conventional graphic that securely associates it with a document.

To verify that the consumer was indeed the person who signed the document, the a public key of the consumer can be utilized to decrypt the abstract portion of the signature. The digitally signed abstract is encoded into the graphic signature. Additionally the abstract should match exactly the document abstract that is "in the clear" or not encrypted in the document. This matching demonstrates that the signature 1) was signed by the consumer (because they were the only person in possession of the private key that made the signature) and 2) that the signature is associated with a particular document due to the abstracts matching.

In addition, a consumer may use their secret key to read the memo encoded into the graphic signature. Since the memo is not in the document and cannot be decrypted by others, unlike the abstract, the memo is an additional assurance to the consumer that the document was not forged and also helps them remember the transaction.

Figure 2:
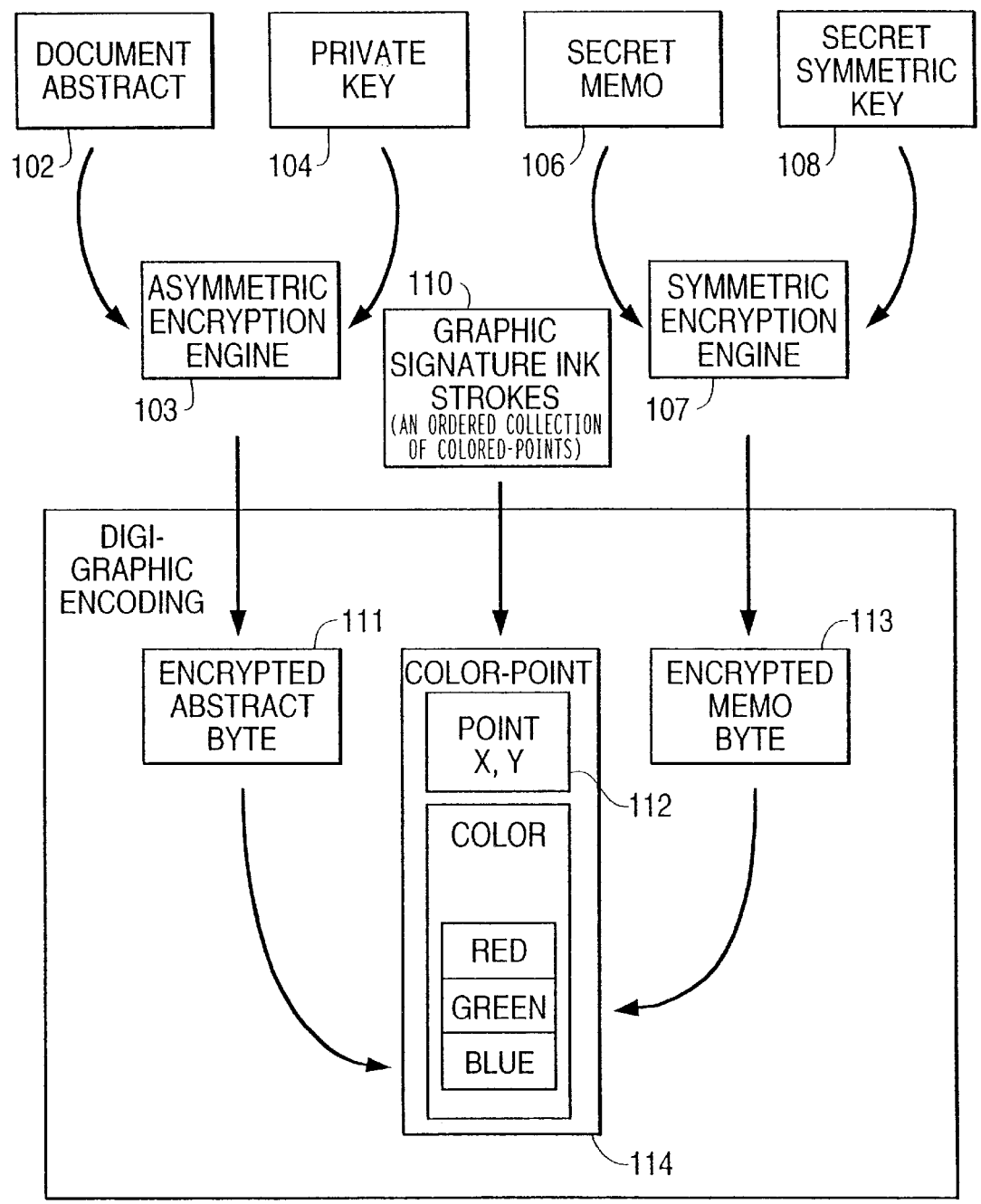
FIG. 2 is a schematic representation of an embodiment of a digital graphic signature system of the present invention.

FIG. 2 provides a schematic representation of a process for producing digital graphic (DigiGraphic) signatures. As shown in FIG. 2, an embodiment of a DigiGraphic signature process according to the present invention includes a document abstract, 102 which is encrypted using a private key 104, in an asymmetric encryption engine 103. The process may further include a secret memo 106 which is encrypted using a secret symmetric key 108 in a symmetric encryption engine 107. The encrypted abstract and/or encrypted memo may then be encoded with graphic signature ink strokes (an ordered collection of Color-Points), 110 produced by a person's signature on a signature pad.

The two encrypted streams are used as color values in a standard RGB color encoding as described above. In FIG. 2 the encrypted abstract bytes 111 correspond to blue and the encrypted memo bytes 113 correspond to green. The graphic signature is defined as a series of ink strokes using color points 112, in the manner described above. The resulting object comprises a merger of the person's signature with a digital signature into a single object 114.

FIG. 3 depicts a schematic flowchart of the DigiGraphic signing dialog. The message sends illustrated in the flowchart would be implemented in software and respond to input from a person using the DigiGraphic signing feature. As shown in FIG. 3, an initial step, or message send, is to prepare a digital document with abstract and body 122. In this step the document originating software forwards, or inputs, 124, the body of a document, and an abstract, to the DigiGraphic software. The document is then read by the DigiGraphic software which generates a document abstract and a document body, 126. A sample document abstract is depicted in FIG. 4 for Ted Smythe, and a sample document body is depicted in FIG. 5.

As shown in FIG. 4, a document abstract 200, may include details 202 relating to the document being executed in a Windows® display 204 which includes tabs 221 ("Abstract"), 222 ("Body") and 223 ("Signature"). Under the "Abstract" tab, a document abstract 200 may include factual details relating to the transaction, including, but not limited to the details shown in FIG. 4:

| | |
|---|---|
| Date | 03/23/1998 |
| Invoice | 352864 |
| Merchant | Radioshack 01-3516 |
| Sold To | Ted Smythe |
| Credit Card Type | Visa |
| Account | 4321-2345-6789-3456 |
| expires | 04/99 |
| Transaction # | 1485 |
| Authorization | 023598 |
| Note | The card issuer may apply the total amount shown |
| Terms | Sales & returns are subject to terms & conditions agreed to. |
| Thank You | Thank you for shopping at Radio Shack . . . |
| Amount Due | 27.51 |

FIG. 5 depicts a sample document body 210 for the sample transaction, the abstract of which is shown in FIG. 4. As shown in FIG. 5, a document body may include text details 212 of the document body of the document being executed in a Windows® display 214 which includes tabs 221 ("Abstract"), 222 ("Body") and 223 ("Signature"). The document body 212 may be displayed under the "Body" tab.

Figure 6:
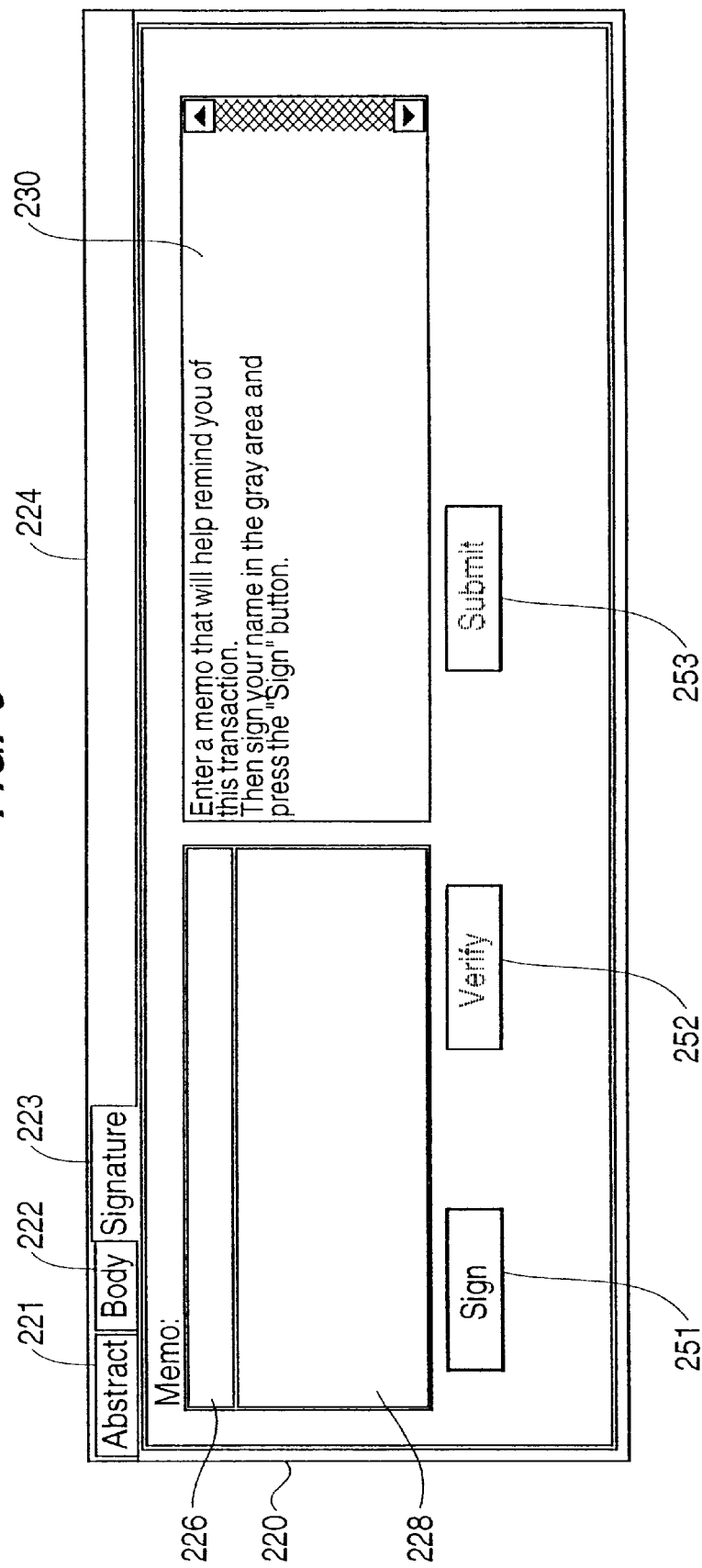
FIG. 6 is a sample screenshot of a signature area before signing in a digital graphic signature system of the present invention.

Referring back to FIG. 3, the person signing the document would review, 128, the document abstract and body and then prompted to enter a memo which will help them remember the document, followed by their signature 130. FIG. 6 depicts a possible embodiment of the user interface which prompts for a memo and signature.

As shown in FIG. 6, a signature user interface 220 may be executed in a Windows® display 224 which includes tabs 221 ("Abstract"), 222 ("Body") and 223 ("Signature"). Under the "Signature" tab, a signature user interface 220 may include a Memo area, 226, a graphic signature area 228 and an memo entry area, 230 where an individual may enter a personal memo relating to the document being executed. The memo entry area 230 may initially include a text prompt, prompting a user to enter a personal memo. The interface 220 may further include "buttons" 251 ("Sign"), 252 ("Verify") and 253 ("Submit") which are linked to implementing routines to enable a user to sign, verify and submit their signature.

Figure 7:
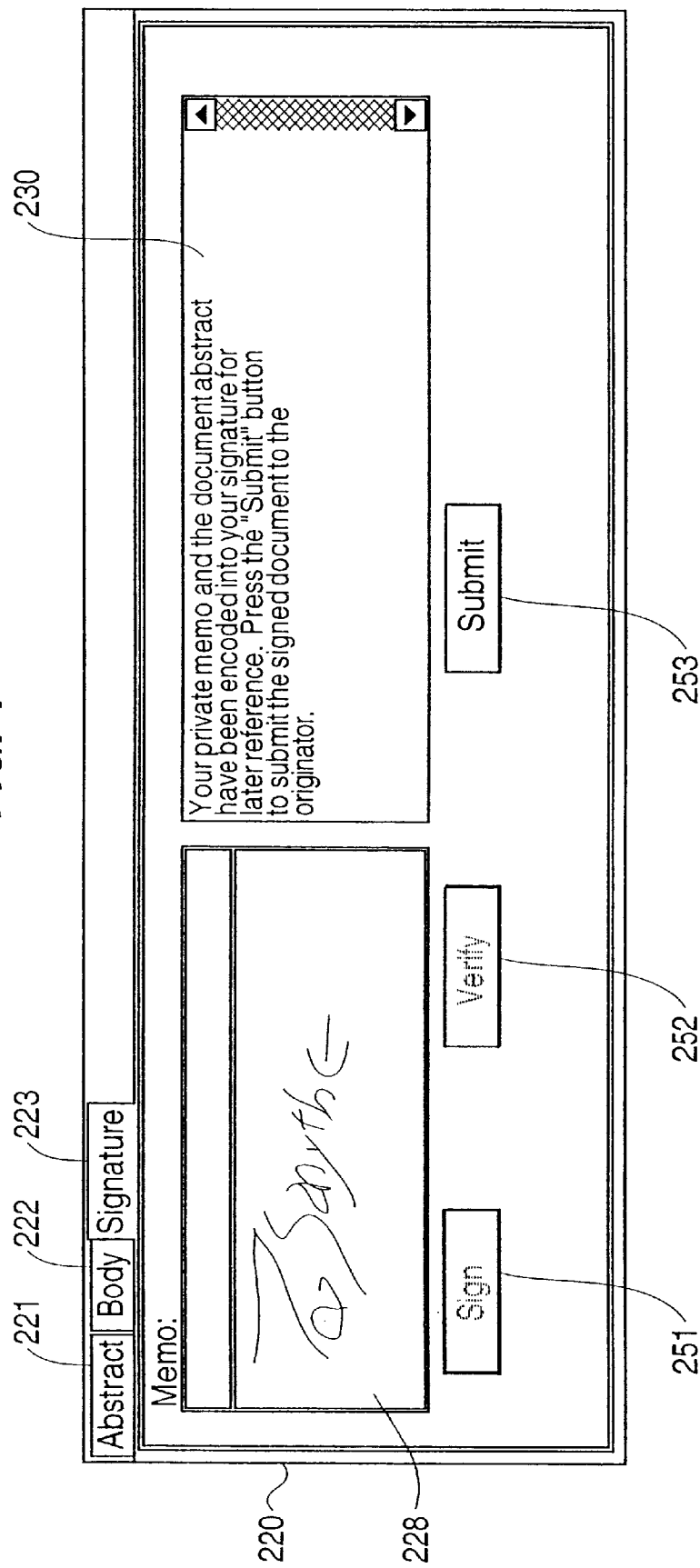
FIG. 7 is a sample screenshot of a signature area post signing in a digital graphic signature system of the present invention.

Post signing, the private memo entered by the user, and the document abstract are returned to the digigraphic signature 132 encoded into the user's signature. FIG. 7 depicts a possible embodiment of an encoded graphic signature, 140 for user "Ted Smythe". The user is then prompted, for example by a text prompt in window 230, to submit the encoded graphic signature to the document originator to "sign" the document and complete the transaction between the user and the document originator. As shown in FIG. 3, 134, the signed document and digital graphic signature may optionally be delivered to a digital document archive or a notary service for verifying the digital signature. The notary service would utilize the signer's public key to verify that the signature has not been forged.

A digital graphic signature system of the present invention may be advantageously utilized in a virtual wallet system, such as the system described in U.S. patent application Ser. No. 09/190,993 filed Nov. 12, 1998, the disclosure of which is hereby incorporated herein by reference.

In a virtual wallet the wallet owner's signature may be advantageously attached to the invoice or receipt in a format that can be recognized by the owner. The format of the final signed document of the present invention goes beyond a typical digital signature by enabling the digital signature to be humanly recognizable. The format of the final signed document enables the owner to visibly distinguish a signature as their own, associate the signature with a particular document, and verify that the signature and document are not forged or copied. The signature comprises a DigiGraphic signature of the present invention and comprises digital signatures and graphics that the wallet owner recognizes as their own. The feature of providing a recognizable and distinguishable digital signature in an electronic document is unique, and akin to the wallet owner recognizing their own hand-written signature in a paper document. This feature helps the wallet owner remember particular transactions and verify their own signature. Further details relating to digital graphic signatures are set forth above.

Notwithstanding the format, it is recommended for a document that needs to be signed that the document comprises at least an abstract and a body. The abstract, also known as the abstract in the clear, comprises a digest of what the consumer is agreeing to when they sign the document, presented in plain, non-graphical text. The abstract may be information concerning the payment, the delivery or the terms and conditions of the transaction, or other similar information. For example, payment information in the abstract may include the date, the parties involved, the general nature of the transaction, and the payment amount. The body comprises the full amount of formatted information that is normally referred to as the document. The body, therefore, comprises all of the details associated with the transaction. Once the document is signed, it has at least three components: the abstract, the body and the signature. There may, however, be other components, such as a general terms and conditions section, shipping information, etc. So, by sending this formatted information to an appropriately enabled browser, for example, an invoice can be rendered for the wallet owner.

In operation, referring to FIG. 3, the signature requester, such as a restaurant, wants the wallet owner to sign a document, such as a receipt. The requester initiates the dialogue and sends a document and an abstract. A feature of the present invention specially formats the document and the abstract and designates it as a signature document for recognition by the software. The wallet server sends the signature document to the wallet interface when it comes on line, thereby supporting both synchronous and asynchronous dialogs. The wallet interface displays the signature document and abstract to the wallet owner for signing. The owner then picks one of their signature key nicknames, or in other words the persona that they are signing with, and they graphically sign the document. The chip device encrypts the abstract with a private key and the memo with a secret key. This allows anyone with public key matching the private key to access the document, while the memo is kept confidential to the owner and anyone else who is given access to the secret key, which may or may not be the public key. The signed document now comprises the body, abstract and the DigiGraphic Signature (DS). The DS includes the digital signature by virtue of the abstract being encrypted with the private key.

Further, the chip device passes the signed document and the associated index back to the wallet server. The chip device is tasked with remembering the index so that the wallet owner does not have to worry about it. The wallet owner can even be off-line. The wallet server archives the signed document and forwards the index, the document identification, and the signature guarantor URL to the signature requester, who stores this information. Finally, the requester acknowledges the receipt of the information. Thus, this feature of the present invention advantageously manages multiple signature keys and their associated indexes.

When the preferred DigiGraphic signature is used to sign a document, as described herein, the DigiGraphic signature object knows how to render a graphic of the signature when requested to do so. The DigiGraphic signature also contains the digital signature. The DigiGraphic signature encapsulates the behavior for third parties to perform signature verifications and for the document signer to verify their own signature and the validity of its association to the document. Further, as one skilled in the art will recognize from the description below, the preferred DigiGraphic signature advantageously serves to authenticate and authorize a document, eliminating the need for bulky digital certificates.

Figure 8:
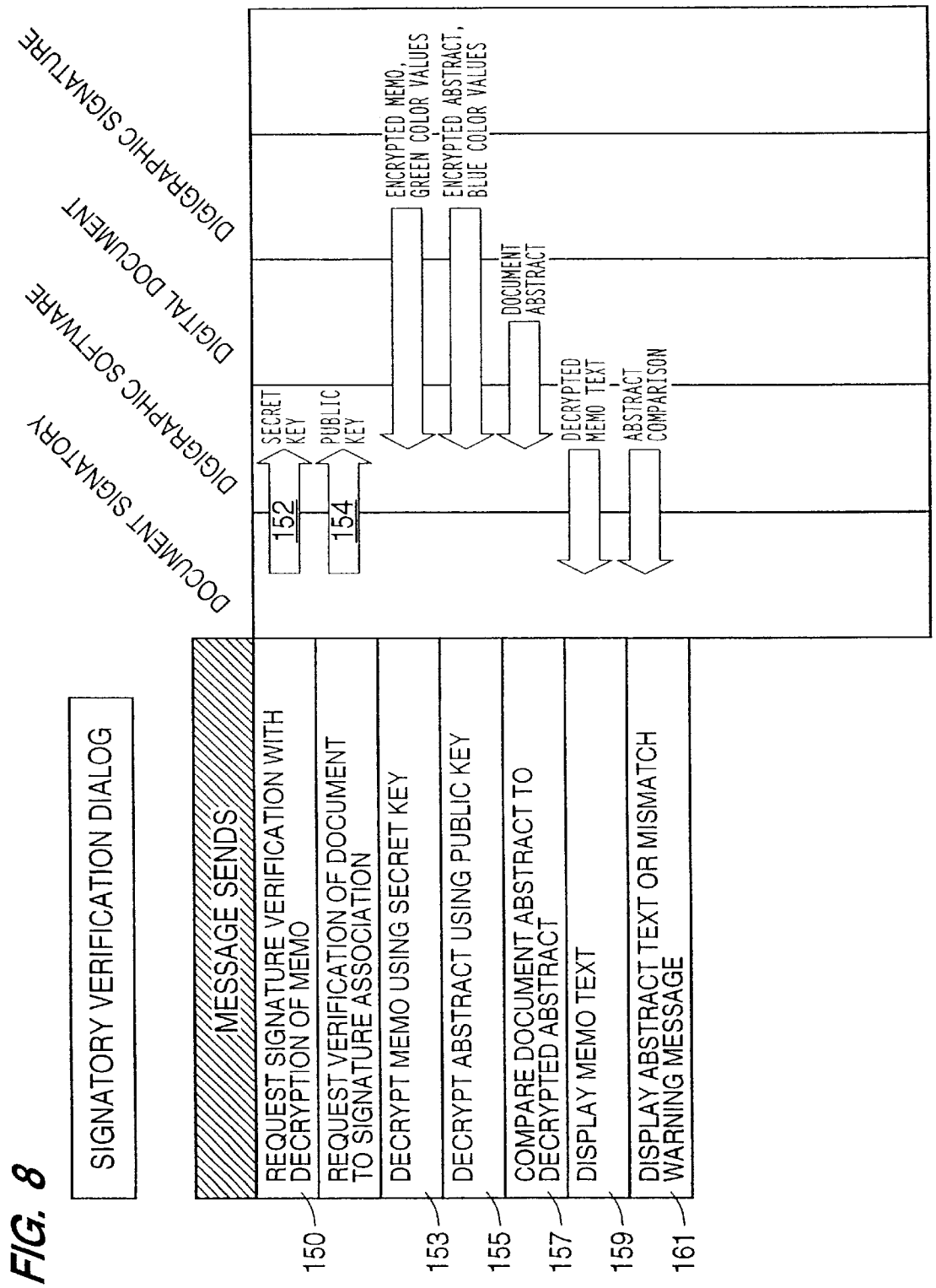
FIG. 8 is a flowchart of a signatory verification function of a digital graphic signature system of the present invention.
Figure 9:
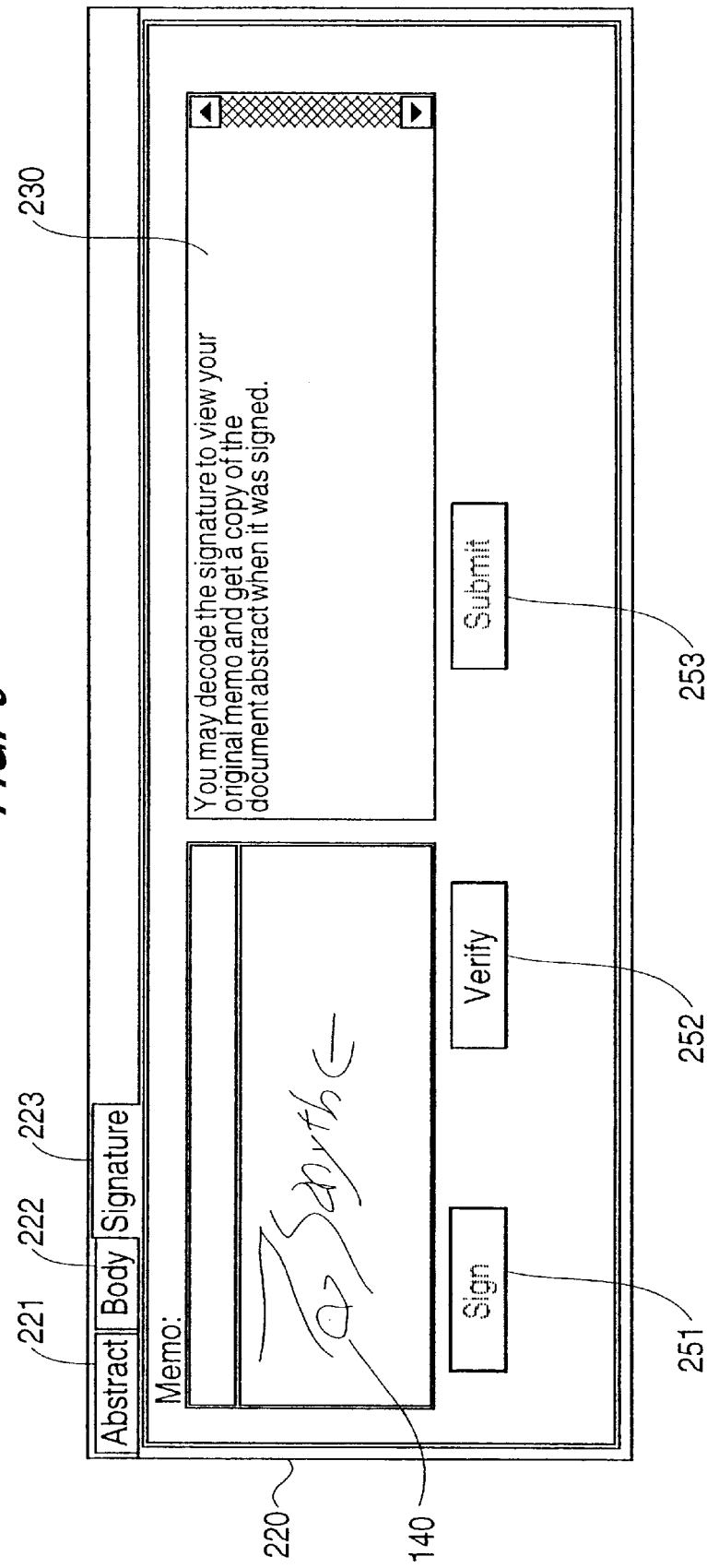
FIG. 9 is a sample screenshot of a signature area pre-verification in a digital graphic signature system of the present invention.

FIG. 8 is a flowchart illustrating a possible verification document for use when the person who signed a document (the signatory) is not sure that they actually signed the document, or does not remember the transaction and desires to view the encrypted memo. Upon retrieval of a document, the signatory may view the signature, 140 on the document. A possible embodiment is shown in FIG. 9 in interface 220. The user may be prompted, for example in window 230 in FIG. 9, to request signature verification 150 (FIG. 8). Upon requesting verification the potential signatory's (verifier's) secret key 152 is utilized to decode the memo accompanying the signature 153. In order to use the secret key the user's would be prompted to enter a password. The potential signatory's public key, 154 is utilized to decode the signature and the document abstract 155. The decoded memo and the document abstract are then compared to the actual memo and document abstract 157 and if they match are displayed to the signatory, for example in windows 228 and 230 in FIG. 9 to allow the signatory to verify that they have signed the document, 159. A possible embodiment is shown in FIG. 10.

Figure 10:
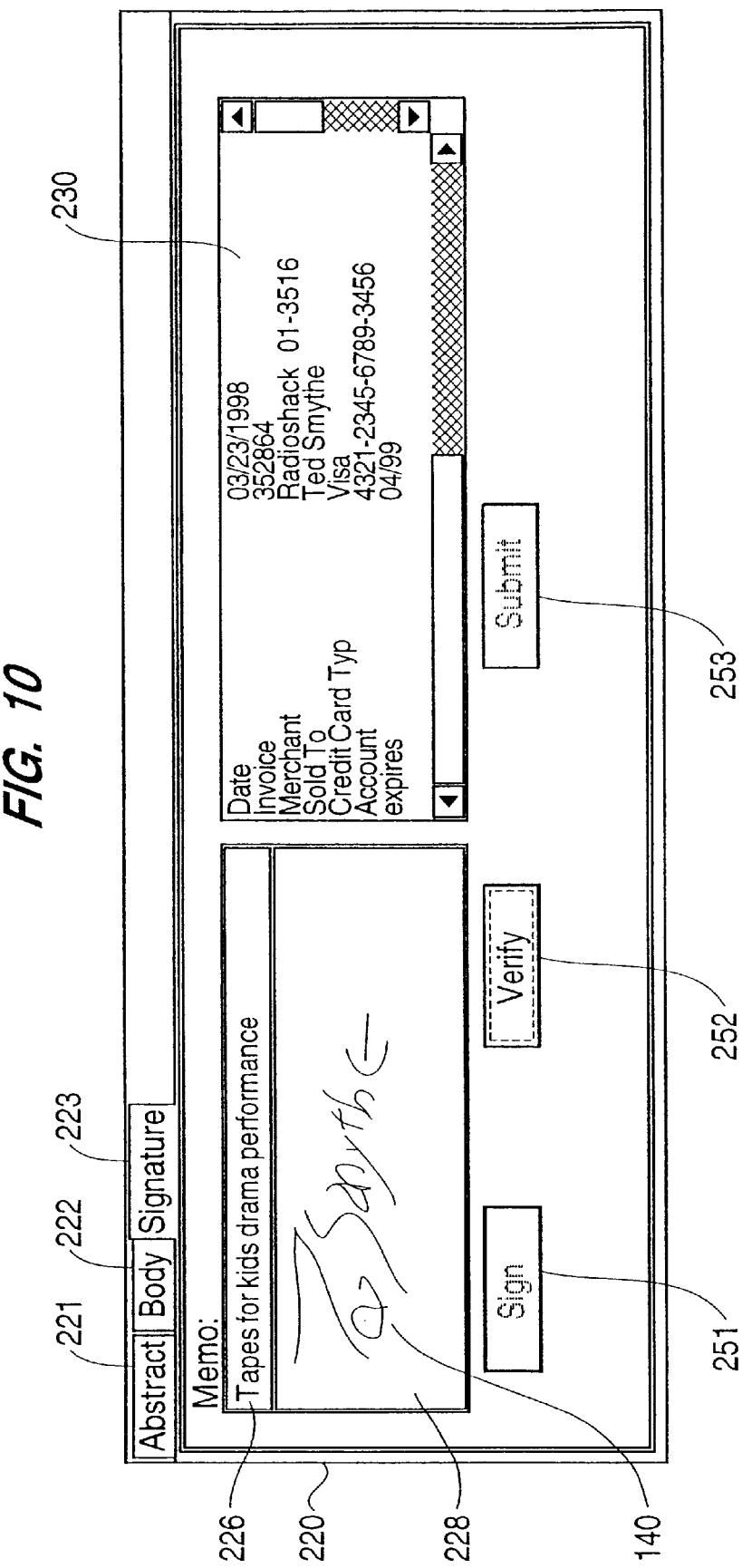
FIG. 10 is a sample screenshot of a signature area post verification in a digital graphic signature system of the present invention.

As shown in FIG. 10, a signature 140 ("Ted Smythe") may be displayed in window 228, a personal memo displayed in window 226 and a document abstract in window 230. In FIG. 10, the document abstract corresponds to the abstract depicted in FIG. 4.

If the memo, abstract and/or signature are not decodable, or do not match the document's, a warning message may be displayed to the user and the signatory may notify the document originator of a potential forgery 161.

Another feature of the present invention, referring to FIG. 8, advantageously further addresses the consumer feeling for the need to recognize their own digital signature. When a wallet owner wants to verify the authenticity of their signature on a signed document, then the local signature verification feature is utilized. Alternatively or additionally, the system may automatically verify the signature every time a document is opened, and only alert the wallet owner whenever there is a mismatch. For example, the warning may say something like "The signature does not match the abstract."

In the present case, the wallet owner retrieves a document and abstract from the document archive, which may reside on the owner's personal computer, in the wallet server, or in other similar devices. As discussed above, preferably the document is signed utilizing the DigiGraphic Signature. The wallet owner wants to make sure the signature is not forged, for example, and requests verification. The wallet interface sends a public key request to the secure chip device, which returns the key that was previously stored in association with the document. The interface then uses the key to decrypt the digital portion of the signature, comprising the abstract. The interface compares the decrypted abstract information to that of the abstract in the clear, or the abstract that is not encrypted in the document. That comparison demonstrates that the signature was signed by the owner because they were the only person in possession of the private key that made the signature, and that the signature is associated to that specific document due to the matching abstracts. Further, the graphic portion of the signature is recognizable to the owner, and the fact that the decrypted abstract, which was merged with graphical signature, matches the abstract in the clear assures the owner of it's authenticity. Thus, the wallet interface then returns a message to be viewed by the owner reporting the results of the verification check.

The combination of the digital and graphical comparison advantageously allows the signature to be verified for that particular document. This feature is unique and allows for high confidence as compared to merely checking the digital signature, which comprises bits that may be undetectably copied. Thus, this feature verifies that the DigiGraphic signature is the original signature, and not just something that looks like the original.

Additionally, this feature advantageously allows only the wallet owner to decode the memo, which is not stored anywhere else in the document, and which may contain a reminder to the wallet owner of the transaction.

Figure 11:
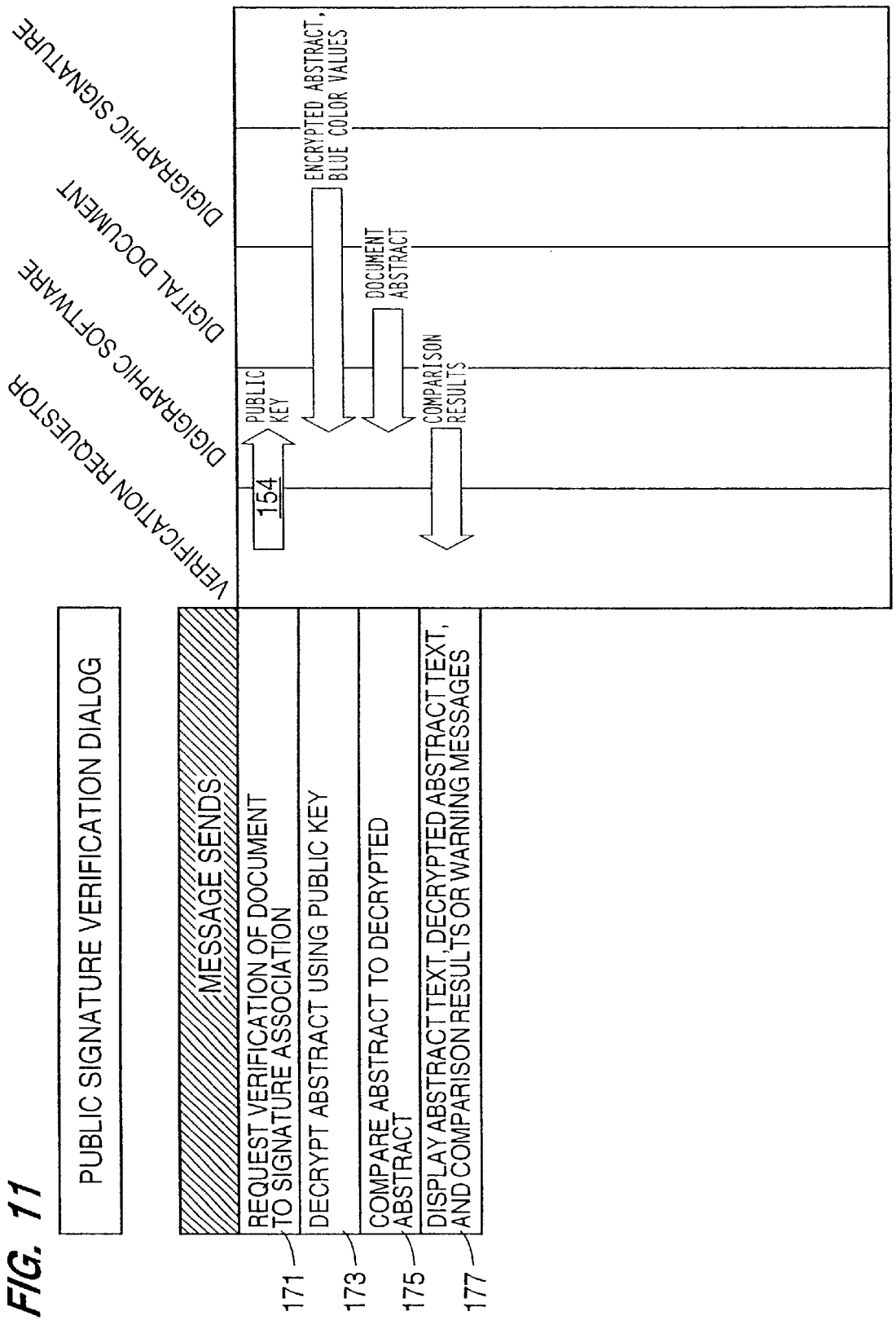
FIG. 11 is a flowchart of a public signatory verification function of a digital graphic signature system of the present invention.

FIG. 11 is a flowchart of a possible public signature verification dialog for use with the digital graphic signature system of the present invention. The dialog may be used when someone other than the signatory, for example a merchant or notary, wishes to verify the signature. As set forth above, only a signatory may view the memo text associated with the signature. Further, although an optional comparison of the document and digital graphic signature held by the requesting party to that of a third party notary is not included in FIG. 11, such features may be added by similar steps.

As shown in FIG. 11, when a request for verification of a digital graphic signature is made by a third party requester, 171 the signatory's public key 154 is utilized to decode the document. This public key would have been previously supplied to the requester. The public key decrypts the document abstract 173. The decrypted abstract is compared to the actual document abstract, 175 and the results, or warnings in the case they do not match are displayed to the requester, 177.

Referring to FIG. 11, the present invention advantageously provides a service through electronic mail, direct login, or the world wide web for electronic signature verification. In this case the verification requester sends the signed document, the document ID, and the signer's index to a signature guarantor. For example, on the world wide web, it may look like this:

```
http://www.citibank.com/verifysignature
    Signature:        (insert DigiGraphic signature)
    of Signer:        (insert Index)
    Against:          (insert Document ID)
    With:             (insert Abstract).
```

The index of the signer is unique to each signature guarantor, so they know who the signer is and what public key was used. Also, the document ID may be found in the wallet server, which archived at least the abstract of the document when the document was initially signed. Finally, the abstract is the document on which the verification requester is asking to have the signature verification performed.

The signature guarantor utilizes the index to look up the public key in the public key archive. The signature guarantor uses the public key, in turn, to decrypt the signature that is being verified. If the signature decrypts at all, then that verifies that the signature is from the signer of record. By using the document ID, the signature guarantor looks up its copy of the abstract, and compares it with the submitted abstract to further verify that it is the correct signature on the correct document. Then, the signature guarantor returns the results to the verification requester.

This feature of the present invention advantageously utilizes the index and document ID to verify the signature. On the other hand, current methods require certificates that contain very large amounts of information, such as the public key, the certifier of the certificate and the abstract. Further, because of this large amount of information, the signature guarantor using current methods has no active role in guaranteeing the process. On the other hand, the signature guarantor has a very active role in the present invention. Thus, this feature of the present invention more efficiently and economically enables the verification of signatures.

As will be realized from the foregoing description, the digital graphic signature system of the present invention includes many advantageous features.

According to the present invention, a digital signature and a secret memo may advantageously be encoded into a single graphic signature.

An additional advantage is that the graphic signature is recognizable to the signer of the document who also has assurances that the signature is associated with a particular document and was actually signed by the signer and not forged.

A further advantage of the digital graphic signature system of the present invention is that the digital portion of the signature may be verified by a third party with knowledge of the public portion of the signatory's security key.

A still further advantage of the digital graphic signature system of the present invention is that the memo associated with a document remains secret to the signer of the document.

As in the description of a virtual wallet system of the present invention, the digital graphic signature system of the present invention may be advantageously utilized in conjunction with a virtual wallet system of the present invention.

Figure 12:
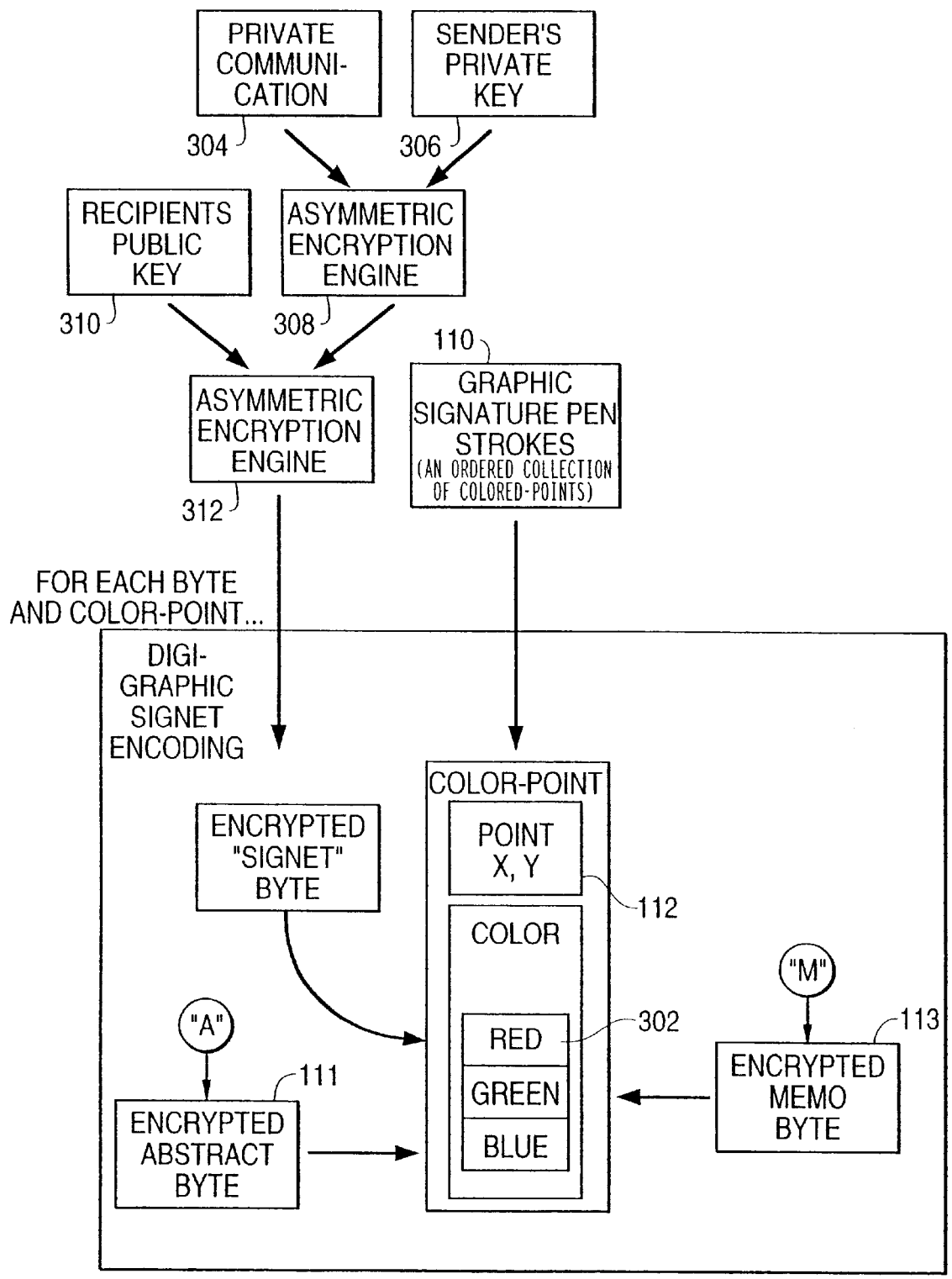
FIG. 12 is a schematic representation of an embodiment of a digital graphic signature system including a digital graphic signet of the present invention.

FIG. 12 provides a schematic representation of a digital graphic signature system of the present invention which includes a digital graphic signet. Encrypted abstract byte, 111 and encrypted memo byte, 113 are produced as described above and depicted in FIG. 2. The off page connector "A" represents that stream entering the encoding process as it did before in the previous discussion. Likewise, The secret memo is encoded in the same way as it was before. The off page connector "M" represents that stream entering the encoding process as it did before.

In the embodiment of a digital graphic signet of the present invention depicted in FIG. 12, the red color byte value 302 is utilized for a private communication. As shown in FIG. 12, a private communication, 304 may be reduced to textual representation and encrypted using the sender's (signatory) private key 306. The result of the encryption 308, is then encrypted again with the recipient's public key 310. The result of that last operation may then be used, byte for byte, as the red color value in the Color Point object stream described in the previous discussion with reference to FIG. 2 on a digital graphic signature.

Upon receipt of the communication, the recipient will first use their private key to decrypt the first layer. Because they will be receiving a digital graphic signet with the document, which is distinct from a digital graphic signature, they will know that there is a private communication in the red color value and process it differently than they would a digital graphic signature. Once they have the first layer decrypted, they will use the public key of the sender to decrypt the final layer. Double encryption and the order of encryption and decryption is advantageous for several reasons.

If a single level encryption were used, if the sender used the public key of the recipient, then only the recipient could decode the message, which is one desirable trait. However, the recipient would not know for sure that the claimed sender was in fact the real sender without another digital signature.

Suppose that instead of using the recipient's public key, the sender uses their private key. Then the recipient can use the sender's public key to decrypt the message and will know only they could have sent the message, the other desirable trait. This has a problem too, however, in that anyone else with knowledge of the sender's public key (which should be everyone since a public key is public) could also decrypt the message.

The usage of double encryption according to the present invention is novel and unique as it leverages off the concept of digital graphic signatures. The digital graphic signet may be a component of a document, and therefore may be flexible in how it is used.

For example, if the private communication is short, the content of the communication can be fully contained in the digital graphic signet. The abstract of the document would be used to convey the general nature, but not the details. The body of the document may be empty or a copy of the abstract.

In longer private communications, a symmetric key may be encoded in the digital graphic signet to be used to decode the body of the document. This is not unlike a "session key" described in conventional cryptographic literature. Another advantage of the digital graphic signet's flexibility is it can be used synchronously, as in an online session, or asynchronously, as in an E-mail document.

Although a digital graphic signet may be used in all transactions, it benefits may be found in communications other than those utilized to communicate actual online session keys, as there is already robust technology available (e.g. Diffie-Hellman), and that type of security is general at a lower level (transport layer vs. application layer) of network communications. A digital graphic signet could be used in addition to conventional session keys for added security. This is particularly advantageous when the intent is to keep the content encrypted, and prevent it from appearing in the clear once it is received at the recipient's server.

For example, a bank customer may wish to change their ATM PIN over the Internet. The document could contain an abstract that might be as general as only indicating that it is a customer instruction to the bank. Since an ATM PIN change is a short message, the Signet would have the necessary account number, old PIN, and new PIN encoded into its red color value, as described earlier. Given an appropriate prevailing encryption technology is used, the strength of the encryption will be robust, the sender will be able to be authenticated, and only the intended recipient (the bank) will be able to see the details of the transaction. The abstract in the clear will give the bank processing center enough information to transport the Signet to an appropriately secure environment to decrypt and process the transaction without compromising the privacy or the security of the transaction.

Although the invention has been described with reference to preferred embodiments and features, other similar embodiments and features may be utilized to obtain similar results. Variations and modifications of the present invention will be apparent to one skilled in the art and the present disclosure is intended to cover all such modifications and equivalents within the scope of the following claims.

What is claimed is:

1. A digital graphic signature for a transaction involving an individual the digital graphic signature having a visual representation comprising a plurality of points the digital graphic signature comprising:

merged points of at least a first color corresponding to transaction details data and points of at least a second color corresponding to the individual's signature data the points forming a visual representation of the individual's signature.

2. The digital graphic signature of claim 1 wherein the transaction details data comprise at least one of the following:

an abstract of the document being executed;

the body of the document being executed;

excerpts from the body of the document being executed; or an individual's notes relating to the document being executed.

3. The digital graphic signature of claim 2 wherein the transaction details data comprise the abstract.

4. The digital graphic signature system of claim 3 wherein the abstract comprises a digest of what the individual is actually agreeing to by executing the document.

5. The digital graphic signature of claim 3 wherein the abstract comprises at least one of the following types of reference information: the date, the parties involved, or a transaction reference number.

6. The digital graphic signature of claim 3 wherein the abstract is in text.

7. The digital graphic signature of claim 2 wherein the transaction details data comprise excerpts from the body of the document being executed.

8. The digital graphic signature of claim 3 wherein the transaction details data comprise excerpts from the body of the document being executed.

9. The digital graphic signature of claim 7 wherein the excerpts are in text form.

10. The digital graphic signature of claim 2 wherein the transaction details data comprise the body of the document being executed.

11. The digital graphic signature of claim 2 wherein the transaction details data further comprise an individual's notes.

12. The digital graphic signature of claim 11 wherein the individual's notes comprise the purpose of the transaction, the nature of the transaction, or other details having significance to the individual.

13. The digital graphic signature of claim 3 wherein the transaction details data further comprises an individual's notes.

14. The digital graphic signature of claim 1 wherein the individual's signature data comprises graphical data generated from a graphic of the individual signature.

15. The digital graphic signature of claim 1 wherein the transaction details data and the individual's signature data are encrypted.

16. The digital graphic signature of claim 1 wherein the merged points are color encoded.

17. The digital graphic signature of claim 13 wherein the transaction details data and the individual's signature data are color encoded wherein the abstract comprises blue values, the individual's notes comprise green values and the individual's signature data comprise red values.

18. The digital graphic signature of claim 1 wherein the visual representation is capable of being displayed on a video display terminal.

19. A digital graphic signature of claim 1 further comprising a digital graphic signet encoded in at least one of the plurality of colors.

20. A digital graphic signature system comprising:
   the digital graphic signature of claim 1;
   an input apparatus for the transaction details data;
   an input apparatus for the signature data; and
   a video display terminal.

21. A method for producing a digital graphic signature corresponding to a document executed by an individual, the method comprising:
   forming an abstract of the document;
   obtaining the individual's signature;
   producing a document abstract data stream from the abstract;
   producing a signature data stream from the signature; and
   merging the document abstract data stream and the signature data stream into a digital graphic signature.

22. The method of claim 21 further comprising:
   obtaining memo data from the individual;
   producing a document memo data stream; and
   merging the document abstract data stream, the document memo data stream and the signature data stream into a digital graphic signature.

23. A method for producing a digital graphic signature corresponding to a document executed by an individual, the document method comprising:
   selecting details relating to the document;
   forming an abstract of the document;
   obtaining the individual's signature;
   producing a document details data stream from the details;
   producing a document abstract data stream from the abstract;
   producing a signature data stream from the signature; and
   merging the document details data stream; the document abstract data stream and the signature data stream into a digital graphic signature.

24. The method of claim 23 further comprising:
   obtaining memo data from the individual;
   producing a document memo data stream; and
   merging the document details data stream; the document abstract data stream, the document memo data stream and the signature data stream into a digital graphic signature.

* * * * *